Dec. 25, 1962 E. J. BUCZAK 3,070,384
NESTING MARKET CART HAVING A SLING SEAT
Filed June 5, 1961 3 Sheets-Sheet 1
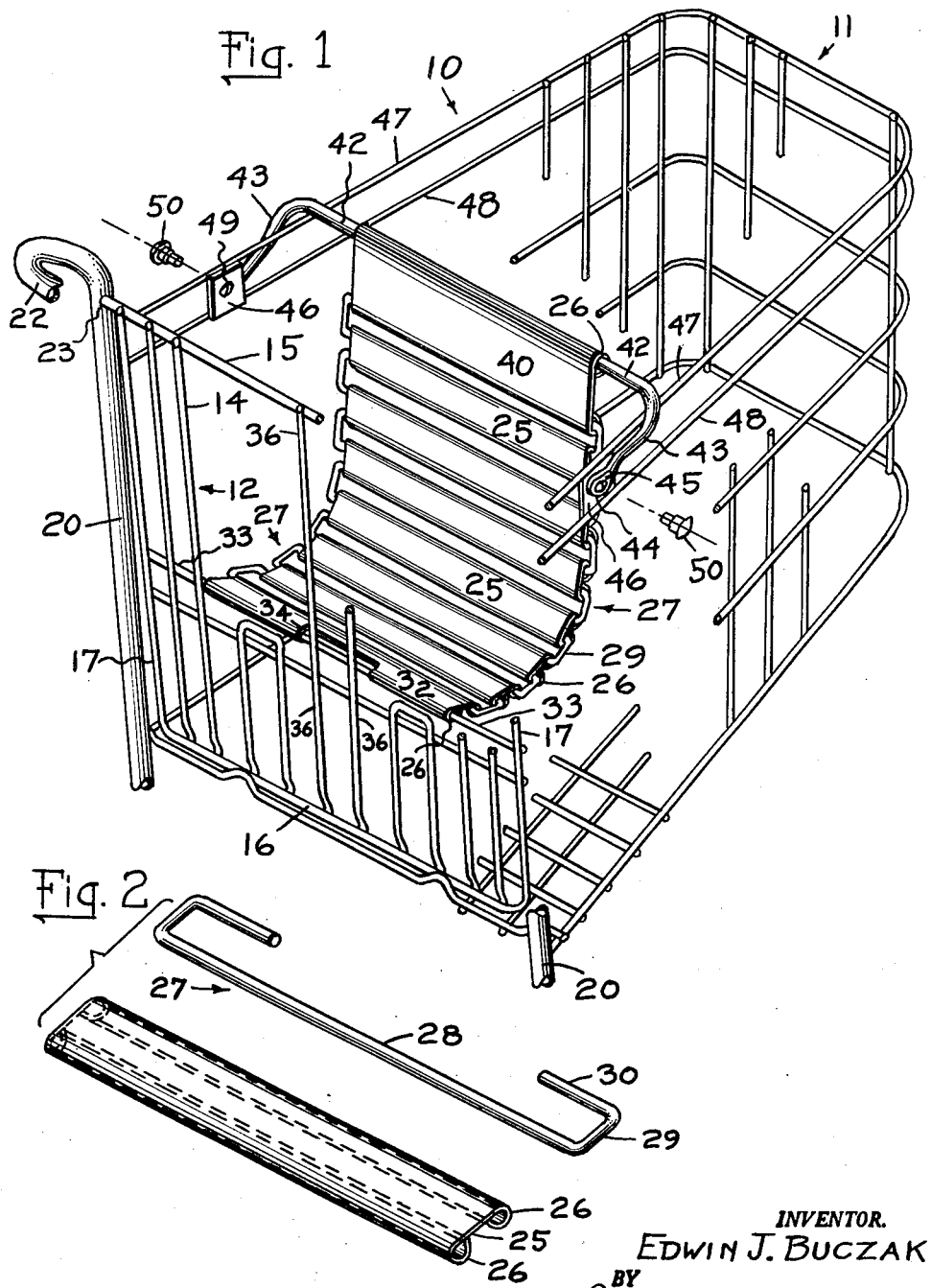
INVENTOR.
EDWIN J. BUCZAK
BY
Clayton L. Jenks
ATTORNEY

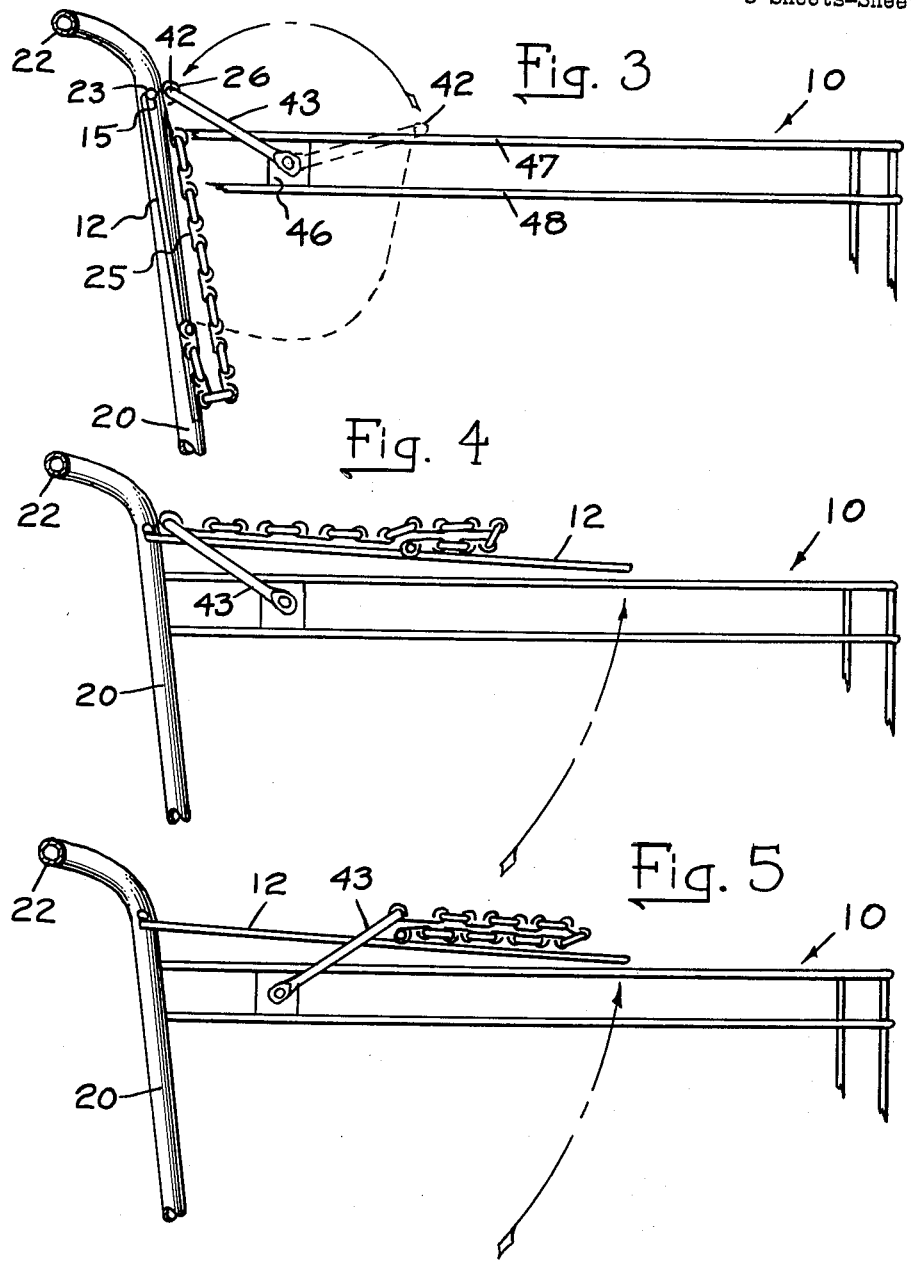

Dec. 25, 1962 E. J. BUCZAK 3,070,384
NESTING MARKET CART HAVING A SLING SEAT
Filed June 5, 1961 3 Sheets-Sheet 3
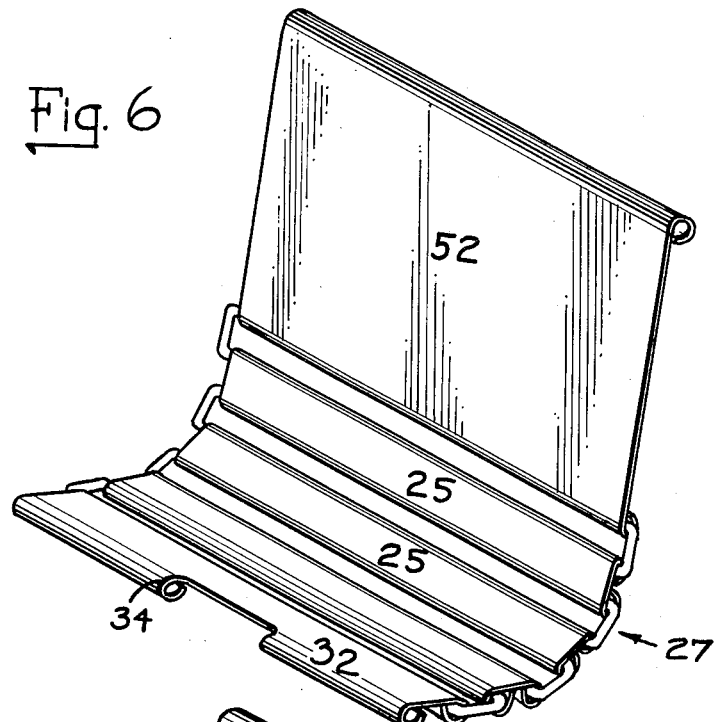
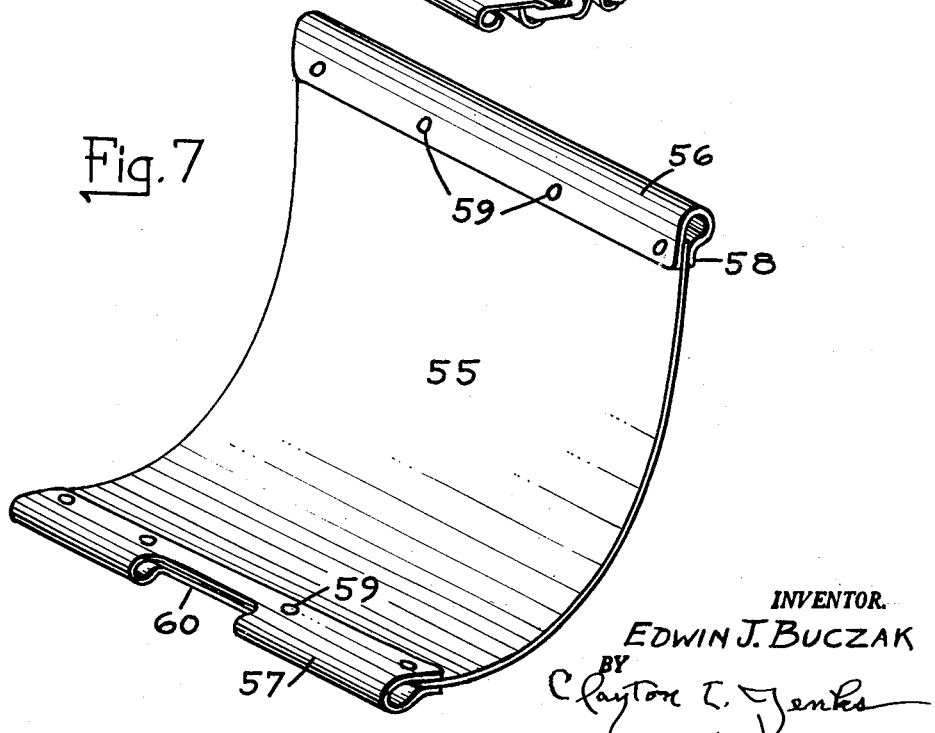
INVENTOR.
EDWIN J. BUCZAK
BY Clayton C. Jenks
ATTORNEY United States Patent Office 3,070,384
Patented Dec. 25, 1962

3,070,384
NESTING MARKET CART HAVING A SLING SEAT
Edwin J. Buczak, 145 Wildwood Ave., Worcester, Mass.
Filed June 5, 1961, Ser. No. 114,868
7 Claims. (Cl. 280—33.99)

This invention relates to a nesting market cart having a collapsible seat for a child.

A nesting market cart of this general class comprises a basket on a wheeled frame having a rear wall formed as a swinging gate arranged to be thrust upwardly by the nose of another basket nesting therewith. The standard cart is provided with a seat so arranged that a child may face the handlebar of the cart and the person pushing it. This seat has usually been made of separate rigid back and seat portions hinged together and so mounted and arranged that they may be folded into inoperative out of the way positions either by the raising of the swinging gate during nesting or manually when the gate is to be left in the lowermost position. The seat parts, like the basket, have been made heretofore of wire rods welded together as rigid seat and back structures. Such a seat has exposed cut wire ends and sharp projections inherent in a welded structure which may both injure the child occupant and tear his clothing. This seat structure has been complex as needed to satisfy the folding and nesting requirements. Hence, the rough treatment accorded by the users has often damaged the structure or has thrown the gate out of a proper location, which may result in injury to a child, such as when the gate is accidentally forced past a normal stopped position and a child on the seat might then be toppled head first onto the floor. In many structures, the seat has been carried solely by a gate or by a secondary swinging structure, which both increases the cost of manufacture and necessitates an expensive complexity of structure to insure the required semi-automatic folding of the seat into an out of the way position when the two carts are nested or a manual folding of the seat to permit the full use of the storage space of the basket.

The primary object of this invention is to provide a market cart seat of a simple and low cost structure which will fulfill all the necessary functions and requirements in a nesting type market cart and which eliminates the problems inherent in structures required for folding two rigid back and seat parts that are hinged together.

Another object of this invention is to overcome the disadvantages of prior art constructions and to provide a flexible seat for market carts of the nesting variety which eliminates many cut wire edges and welded portions that might provide a potential injury to the child occupant and damage to his clothing.

A further object is to provide a flexible seat as distinguished from one formed by rigid back and seat elements hinged together and which is either ready for supporting a child when the gate is down or may be readily moved by a simple manual operation either to an open child carrying position or closed to an inoperative position where it is folded out of the way and permits the full and unrestricted use of substantially the entire capacity of the basket.

A further object is to provide a basket structure having a rear gate provided with leg openings for a child and an associated flexible seat in which the seat may be manually folded to an inoperative looped condition where it closes the leg openings, and wherein the seat will automatically fold out of the way when the gate is swung upwardly in a nesting operation.

A still further object is to provide a seat structure which is supported at one end by the gate and at its top portion by the basket structure so that the weight of the child is carried by both the gate and the basket and the safety of the child is not dependent solely on the gate structure. Other objects will be readily apparent in the following disclosures:

In accordance with this invention, the seat comprises a sling-like structure suitably carried by the cart which is made of a flexible foldable material, such as cloth, a synthetic plastic, woven wire or other fabric or preferably a set of flat surfaced slats or wires hinged together in a continuous linkage somewhat like a chain so that the sling seat is substantially uniformly flexible as a jointed structure throughout at least an extensive lower seat portion which adjusts itself to the size and shape of a child supported thereby and which may be folded as a looped body either manually or by raising the gate.

Referring to the drawings illustrating preferred embodiments of the invention:

FIG. 1 is a fragmentary perspective view of a basket portion of a cart and its frame structure embodying one embodiment of a sling seat construction;

FIG. 2 is an exploded or disassembled perspective view of a sling seat slat and a locking link which secures two slats together;

FIG. 3 is a fragmentary side elevation showing the gate down and the seat in a folded and inoperative position where it covers the leg openings and provides for full use of the basket;

FIG. 4 is a similar side elevation showing the position of the seat and supporting parts when the rear gate is lifted in a nesting operation and the seat is swung upwardly from the inoperative position of FIG. 3;

FIG. 5 is a similar view showing the relationship of the parts when the seat is moved from the operative position of FIG. 1 by swinging the gate upwardly;

FIG. 6 is a perspective view of a modified form of seat in which the upper slat of the FIG. 1 seat is made wider vertically to form a firm back support; and FIG. 7 is a perspective view of a fabric sling seat which has ends shaped to carry the cross rods from which the fabric is suspended.

Referring first to FIG. 1, a market cart of the nesting type comprises a basket 10 which may be formed of rods of wire cut to size and suitably welded together and whereine the basket is shaped to provide a narrow front portion 11 adapted to be inserted into the wider open space at the rear of a like basket. The rear wall of the basket comprises a gate 12 having substantially parallel end rods 14 welded at their tops to a cross rod 15 and at their bottoms to a cross rod 16 integral with vertical side rods 17 forming a U-shaped frame. The frame of the cart comprises a pipe structure 20 carrying the usual wheels and other features which form no part of the present invention. The vertical parts 20 of the cart frame are suitably shaped to form a horizontal handle 22 by which the cart is propelled. The vertical tubes 20 of the cart frame have oppositely aligned inwardly opening holes 23 at their inner faces which form bearings for the gate suspension rods 15, and the parts are suitably constructed so that the gate may be swung upwardly to the position indicated in FIGS. 4 and 5, when two carts are nested.

The primary feature of this invention relates to a sling type of seat which is suitably supported by the basket. The sling seat in the embodiment shown particularly in FIGS. 1 and 2 comprises thin metal slats 25 pivotally hinged together by pivot links 27 as a jointed structure which will flex freely both to fit a child seated thereon and to fold into a loop when moved out of its operative position. Each of the slats has a smooth topped surface against which a child is seated. The slat is preferably formed as a rectangular plate inturned at its opposite longer edges to form metal loops 26 which serve as bearings for the metal pivot link 27. The link 27 is formed of a single piece of wire or rod bent as shown to provide the continuous straight portion 28 which extends lengthwise through and projects from one of the pivot bearings 26. The rod 27 is bent to provide a spacing arm 29 and an inturned pivot arm 30 parallel with the long bearing portion 28. As is readily apparent in FIG. 1, these slats 25 are pivotally connected by the links 27 and spaced apart slightly by a distance determined by the length of the cross portion 29 of the link 27. This spacing is such that a child's finger or clothing cannot be pinched between the slats.

The lowermost link 32 of the seat has its outermost bearing loop 26 mounted directly on the cross rod 33 which is secured by welding to the two vertical parallel end rods 17 of the gate. The link 32 is cut away centrally at 34, and the cross rod 33 is welded to the two vertical rods 36 which are in turn welded at their top and bottom ends respectively to the pivot rod 15 and the bottom gate rod 16. These two upright rods 36 are centrally located and spaced from the outer gate rods 14 by a sufficient distance to form two leg openings for the child carried by the seat.

The top slat 40, which is shown as wider laterally than the next adjacent slat 25, is preferably suspended by a movable structure which provides for the seat being folded out of the way manually when it is not to be used, and which permits a nesting of two carts and the gate being raised to the position of either FIG. 4 or FIG. 5. In the embodiment shown, the looped bearing portion 26 of the top slat 40 is pivotally supported by a U-shaped cross bar 42 mounted on the basket. As shown, the cross bar 42 has substantially parallel arms 43 which have been flattened at their ends 44 and perforated at 45 to provide pivot bearings. The supports for the pivot bearings of these arms 43 may each be simply formed as a metal plate 46 welded between the two top longitudinal rods 47, 48 (FIG. 1) of the basket. These plates 46 are provided with bearing holes 49, and headed rivets 50, shown removed, are passed through the bearing holes 45 and arms 43 and the openings 49 of the plates 46 where they are suitably secured in position, as by heading or other methods. The arms 43 are made of such lengths and the pivots 49 are so located as to provide space for a child's body as well as to suspend the sling seat in a closed loop near the gate.

It will be observed that the pivot plate 46 is spaced at such a distance from the rear handle 20, 22 that the arms 43 and the transverse rod 42 may be swung between the positions shown in full and dotted lines in FIG. 3. Also, the arms 43 are located outside of the basket so that the under side of the cross rod 42 will rest on the top rod 47 of the basket when swung to its right hand end position shown in FIG. 1. In its left hand position of FIG. 3 it may lean against the frame tubes 20 (FIG. 3) or rest on top of the gate, as shown in FIG. 4. The sling seat is thus suspended solely by an upper support 42 and a lower support 33. The latter locates the lower or front end of the seat close to or in lateral contact with the rear wall or gate of the basket and near the bottom of the leg opening. The upper support 42 is movable from a forward position, which holds the seat extended and provides full seating room for a child in front of the rear wall, to a position close to the plane of the rear wall or gate where the seat is folded as a substantially closed or compact loop with its two suspended portions in contact and thus closing each leg opening and providing for full use of the basket space.

It will now be evident that the sling seat will accommodate itself to the shape and size of the child supported thereon and that due to the inner smooth surfaces of the slats the child will be comfortable when positioned with his legs thrust through the openings between the vertical rods 14 and 36. When a child is placed on the seat, the arms 43 of the U-shaped supporting member 42 will be positioned as shown in FIG. 1 with the cross rod 42 remote from the gate. The weight of the child holds the cross rod 42 of the seat tightly against the top rod 47 of the basket. If there is no child on the seat, the U-shaped support 43, 42 may be moved manually from the dotted line position to the full line position of FIG. 3. This serves to fold the flexible seat structure into a close arrangement where the slats 25 are located in front of the leg openings and form closures therefor so that the basket may be used to its full capacity.

If the seat should be in the folded or inoperative position of FIG. 3 and it is desired to nest two carts by thrusting the nose 11 of one basket against the rear of the gate of the basket ahead, this serves to lift the gate 12 to the position of FIG. 4 while the U-shaped seat support 43, 42 remains in its folded condition. This causes the seat to be lifted compactly and to nest against the top of the gate 12 and thus be held fully out of the way.

If the seat is left in the operative position of FIG. 1 with the arms 43 of the support 42 extending toward the right, those arms remain in that position as indicated in FIG. 5 where the gate is lifted and the flexible seat structure is swung upward as it rests above the gate where it remains folded in the more compact configuration of the figure.

As shown in FIG. 6, the top slat 52, which may be made of such suitable material as a thin metal sheet, is sufficiently wide vertically to provide a firm support for a child's back. The other slats 25 and the linkages may be the same as those illustrated in FIG. 1. By reference to FIG. 3, it will be appreciated that the upper wide slat 52 should depend properly from the cross arm 42 and that the lower linked slats 25 should form the foldable portion of the seat. Hence, the back member 52 is not to be made wider than will move without interference between the folding positions of FIGS. 3 and 5. The upper slat 52 is shown as shorter than half of the total length of the seat, so that it will not interfere with the folding operation of FIG. 5 where the pivot arms 43 are in their right hand position.

It will also be appreciated that the flexible sling seat may be made of other materials than the slats above-described. For example, the seat may be formed of a strong canvas cloth or other sheet of fabric, such as a synthetic resin sheet. As illustrated in FIG. 7, a sheet of fabric 55 may be suitably supported in a suspensory position by providing it with bearing portions 56 and 57 at its top and bottom margins. The upper bearing 56 may be formed of a loop of metal or other suitable material shaped to fit on the top cross rod 42 of FIG. 1. The bearing member may be secured to the top margin of the fabric 55 by providing it with parallel flanges 58 between which the fabric is inserted, and rivets 59 are passed through the fabric and the flanges and headed in place to form a tight connection. The bearing of structure 57 at the bottom of the seat is similarly constructed except that it has a cut away portion 60 corresponding with the cut out part 34 of FIG. 1 which permits the vertical rods 36 (FIG. 1) of the gate to be welded to the bearing rod 33. This fabric seat is freely flexible and foldable and will readily form the loop arrangement of FIG. 3 or move back into the child supporting position as indicated in FIG. 7.

It will be observed by reference to FIG. 3 that the sling seat has an extensive fully and freely foldable intermediate portion between the two vertical portions suspended from the upper (42) and the lower (33) cross supports which permits the vertical portions to hang in a substantially close contact. Hence, those vertical portions may be made of various shapes and heights (see FIG. 6) provided they do not interfere with the intermediate portion folding the other portions into a close formation. That is, it is the bottom of the closed loop which must be flexible and freely foldable, within the limits imposed by the material and shapes selected for the sling seat. A fabric will fold readily depending on its stiffness. The folding seat structure of FIGS. 1 to 6 depends primarily on the width of the slat and the location of its hinge joint, but the slats fold into a substantially closed loop and satisfy the requirement of permitting full use of the basket storage space.

It will now be appreciated that various modifications may be made in this structure to provide a sling seat of a foldable type and a movable support which carries the upper end of the seat and serves to transfer the upper supporting rod 42 between its two end positions of either supporting the seat operatively, or holding it folded over the leg openings or raised out of the way by the gate. Hence, the above disclosure is to be interpreted as describing preferred embodiments of the invention and not as imposing limitations on the appended claims.

I claim:

1. A market cart comprising a basket having sides and a rear wall provided with a leg opening for a child, a foldable sling seat having front and upper ends, an upper cross support for said upper end, a lower cross support mounted on the rear wall which locates said front end adjacent to and below said opening, said supports cooperatively forming a sole suspension for said seat, and a manually movable mount which moves said upper support to a rear position close to the plane of said rear wall where said seat is located in front of and closes said opening and alternatively moves said upper support to a forward position which holds said seat extended to provide seating room for a child, said basket and mount cooperatively providing limiting means for stopping the movement of said upper cross support alternatively at the end positions of holding the seat folded and extended for supporting a child, and said sling seat having an extensive intermediate portion between said supports which is capable of folding freely as a substantially closed loop.

2. A market cart according to claim 1 in which said movable mount and limiting means comprises swinging arms connected to the upper support and fixed pivots carried by said basket which are arranged to swing said upper support from a position near the rear wall to a remote child supporting position.

3. A cart according to claim 1 in which said foldable sling seat is a fabric having looped portions mounted respectively on said upper and lower supports.

4. A cart according to claim 1, in which an extensive portion of the sling seat comprises a set of flat topped slats and pivot links connecting and spacing said slats as a flexible foldable assembly, said slats and links being foldable from a child supporting position to one where the slats depend as a loop adjacent the end of the basket.

5. A cart according to claim 4 in which the upper slat is wider than the lower slats and forms a firm back support.

6. A cart according to claim 1 in which the top support comprises a substantially U-shaped member having a transverse rod above the basket which supports the top of the seat, said rod having depending arms, and pivot mounts on the basket for the lower ends of the arms which permit the transverse rod to swing towards and away from the handle.

7. A market cart comprising a frame having a handle, a basket on the frame shaped for nesting with a similar basket, said basket having opposed sides and a rear open end, a gate pivotally suspended at its top to close said open end and alternatively to swing upwardly in a nesting operation, said gate having leg openings therethrough, a foldable sling seat facing said openings, a lower support on the gate near the lower end of the leg openings which carries the lower end of the seat, a manually movable transverse upper support for the upper end of the sling seat, and pivotal mounts on said basket sides, said upper support having long arms pivoted on said mounts which move the upper support and the seat between the limits of a child supporting position and a position close to the gate where the seat is folded, said seat having an extensive portion capable of folding freely as a closed loop suspended solely from said supports and substantially in a lateral contact with said gate and closing said openings.

References Cited in the file of this patent

UNITED STATES PATENTS

| 2,627,899 | Grotefend | Feb. 10, 1953 |
| 2,837,345 | Young | June 3, 1958 |

FOREIGN PATENTS

| 262,493 | Great Britain | Dec. 16, 1926 |
| 970,658 | France | June 21, 1950 |